United States Patent

[11] 3,602,558

| | | |
|---|---|---|
| [72] | Inventor | Warren C. Reynolds<br>Orange, Calif. |
| [21] | Appl. No. | 876,391 |
| [22] | Filed | Nov. 13, 1969 |
| [45] | Patented | Aug. 31, 1971 |
| [73] | Assignee | Lear Siegler, Inc.<br>Santa Monica, Calif. |

[54] SEALED THRUST WASHER ASSEMBLY
4 Claims, 2 Drawing Figs.

[52] U.S. Cl. ................................................... 308/135,
308/238
[51] Int. Cl. ..................................................... F16c 17/04,
F16c 33/20
[50] Field of Search .......................................... 358/135,
137, 238

[56] References Cited
UNITED STATES PATENTS

| | | | |
|---|---|---|---|
| 2,885,248 | 5/1959 | White ........................... | 308/238 |
| 3,405,654 | 10/1968 | Dilg .............................. | 308/137 |

FOREIGN PATENTS

| | | | |
|---|---|---|---|
| 875,525 | 7/1961 | Great Britain ................ | 308/N |

*Primary Examiner*—Martin P. Schwadron
*Assistant Examiner*—Frank Susko
*Attorney*—Barnard, McGlynn & Reising

ABSTRACT: An axially thin thrust bearing assembly comprising an annular wear plate having a beveled peripheral surface, a liner plate having a layer of lubricant-impregnated fabric bonded thereto, the outer edges of the liner plate and fabric being uniformly crimped around the edge of the wear plate to ride against the beveled surface. The wear plate and liner plate are relatively rotatable about an axis of symmetry.

PATENTED AUG 31 1971 3,602,558

INVENTOR.
Warren C. Reynolds
BY
Barnard, McGlynn & Reising
ATTORNEYS

SEALED THRUST WASHER ASSEMBLY

This invention relates to thrust bearings and more particularly to a thrust bearing having relatively rotatable and coaxial inner and outer members of which oppositely adjacent bearing surfaces are separated by a layer of lubricating material.

The prior art discloses various thrust bearing designs and constructions wherein relatively rotating bearing surfaces are axially separated by a layer of lubricant material such as resin impregnated fabric. In one such design the periphery of one bearing member is crimped over the edge of a smaller, axially adjacent member, a lubricating layer being disposed between the two members, and a packing ring being disposed between the smaller member and the crimped over portion of the larger member. Such a design, thus, requires four axially arranged parts which must reside in their proper respective positions after fabrication to provide proper operation.

The subject invention provides a thrust bearing of improved construction in which opposite and adjacent bearing surfaces are separated by a lubricant layer and in which the bearing area is sealed against the ingestion of foreign particles but without the need for a separate sealing ring. In general, this is accomplished by constructing the bearing so as to comprise an inner member having a circular periphery, an outer member having a bearing surface oppositely adjacent a bearing surface of the inner member and a lubricating material fixedly disposed over the bearing surface of the outer member and being substantially coextensive therewith, the periphery of the outer member as well as the lubricating material being deformed around the peripheral edge of the inner member so as to maintain the bearing surfaces oppositely adjacent one another but to permit relative rotation between the inner and outer members about an axis of symmetry.

In a specific form, the inner bearing member is an annular wear plate having a reversely beveled periphery. The outer member or liner plate is also annular and has bonded to the bearing surface thereof a layer of lubricating material such as resin impregnated fabric, this lubricating material being substantially coextensive with the inner bearing surface of the outer member. The combination of the outer member and the lubricating material is uniformly crimped about the circular periphery of the inner member with a light preload so as to sealingly engage the reversely beveled periphery of the inner member to maintain the integrity of the assembly and to prevent the ingestion of foreign particles into the bearing surface area.

The various features and advantages of the subject invention will become more apparent upon reading the following specification which describes an illustrative embodiment thereof. This specification is to be taken with the accompanying drawing of which:

Figure 1:
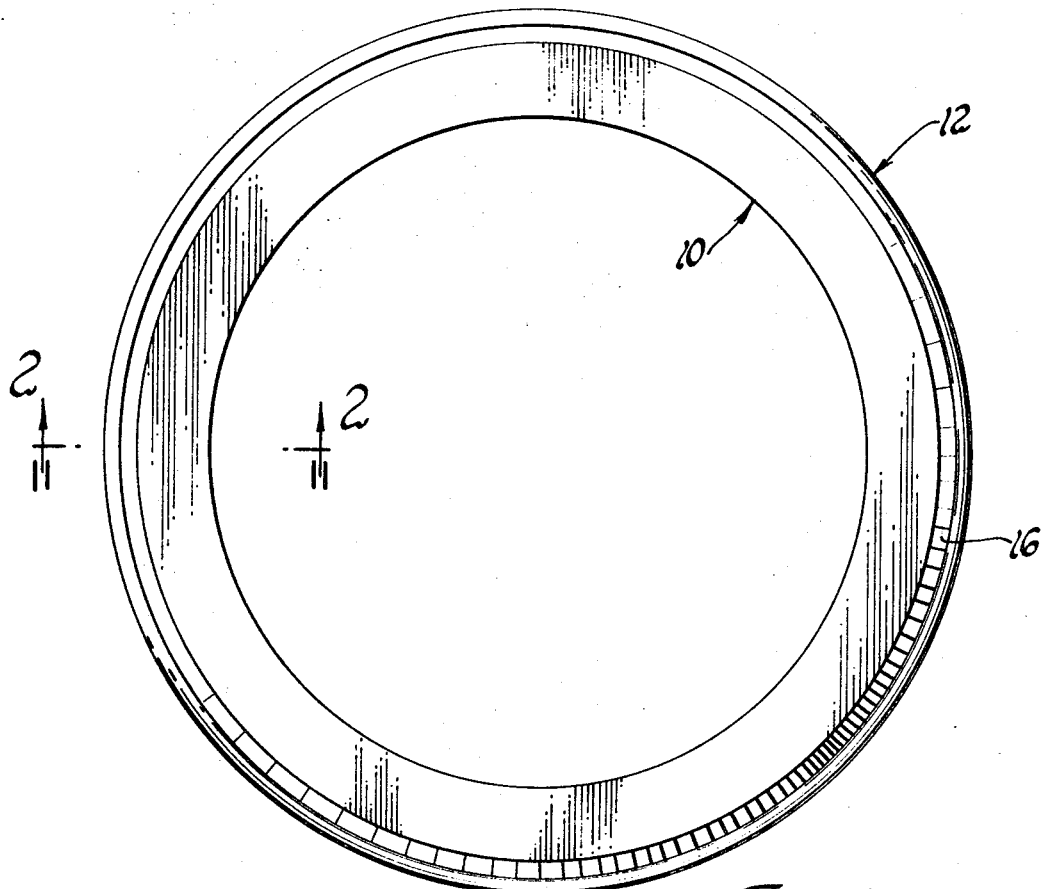
FIG. 1 is a plan view of an illustrative embodiment of the invention.

Referring to FIG. 1 the illustrative embodiment of the invention is shown to comprise an annular inner bearing member 10 in the form of a relatively thick wear plate and a relatively thin annular outer bearing member 12 commonly called a liner plate, the two members being joined together to form an integral thrust bearing assembly having a central axis of symmetry which corresponds with the load axis thereof.

Figure 2:
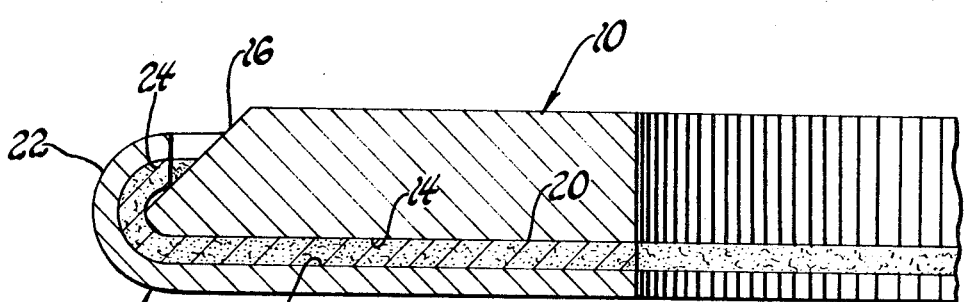
FIG. 2 is an enlarged view of the embodiment of FIG. 1 taken along a section line 2—2 thereof.

As shown in FIG. 2, the assembly exhibits a small axial dimension as compared with the overall diameter thereof. To attain this configuration the plated steel inner member 10 is constructed to have a flat, bearing surface 14 normal to the direction of thrust loads and terminating radially outwardly in a reversely beveled peripheral surface 16. The plated steel outer member 18 is formed with an inner flat bearing surface 18 which is oppositely adjacent to bearing surface 14 of member 10. Bonded to and coextensive with the bearing surface 18 of member 12 is a layer 20 of lubricating material such as a resin impregnated woven fabric of the type disclosed in the U.S. Pat. to C. S. White, No. 2,885,248, issued May 5, 1959 or of the type disclosed in the Reissue patent to C. S. White, Re. 24765, issued Jan. 12, 1960.

The radially outward peripheral area 22 of outer member 12 is uniformly deformed along with the radially outward peripheral area 24 of the lubricating material layer 20 around the peripheral edge of the inner member 10 such that the radially outward edges of the member 18 and layer 20 are substantially coextensive. As shown in FIG. 2, the outward edge of the portion 24 of the lubricant layer 20 engages the beveled peripheral surface 16 of the inner member 10 between the parallel surfaces thereof so as to maintain a seal for the bearing area and, thus, to prevent the ingestion of foreign particles. The crimping of plate area 22 is controlled such that the inner member 10 is freely rotatable relative to the outer member 12 about the axis of symmetry thereof but the layer portion 24 is lightly preloaded against surface 16. Such rotation performs a wiping action between the crimped portion 24 of the lubricant layer 20 and the beveled peripheral surface 16 of the inner member 10.

It has, thus, been shown that a low-thickness, thrust bearing having a deformed or uniformly crimped member and a lubricating layer between the opposed bearing surfaces may be easily fabricated from a minimum number of parts and yet provide a superior seal and structural integrity. It is to be understood that the foregoing description is illustrative in character and is not to be construed in a limiting sense.

The embodiments of the invention in which an exclusive property or privilege is claimed are defined as follows:

1. A thrust bearing having an axis of symmetry and comprising: an inner wear plate having a flat bearing surface terminating in a reversely beveled circular periphery; an outer liner plate having a flat bearing surface oppositely adjacent the face of the wear plate; a layer of lubricating fabric material fixedly disposed over the surface of the liner plate and substantially coextensive therewith; the periphery of the liner plate and material being deformed around the periphery of the wear plate and lightly loaded against the beveled periphery to maintain said surfaces adjacent but to permit relative rotation therebetween about the axis of symmetry.

2. A thrust bearing as defined in claim 1 wherein the lubricating material is a resin impregnated woven fabric.

3. A thrust bearing as defined in claim 1 wherein the axial dimension of each of the wear plate and liner plate are small relative to the diameters thereof.

4. A thrust bearing having an axis of symmetry and comprising: an inner metal wear plate of annular configuration and having a flat bearing surface terminating in a reversely beveled peripheral area; an outer metal liner plate of substantially annular configuration and having a flat bearing surface oppositely adjacent that of the wear plate; a layer of lubricant impregnated fabric coextensive with the surface of the liner plate and bonded thereto, the periphery of the liner plate and the layer being uniformly deformed around the edge of the wear plate and terminating approximately against the beveled area to maintain the surfaces adjacent but to permit rotational freedom therebetween.